US005672434A

United States Patent [19]
Dalebroux et al.

[11] Patent Number: 5,672,434
[45] Date of Patent: Sep. 30, 1997

[54] MULCHING COMPOSITE

[75] Inventors: Dean G. Dalebroux, Green Bay; Peggy D. Sands, Appleton; Robert E. Miller, Appleton; Lowell Schleicher, Appleton; Kenneth D. Glanz, Appleton, all of Wis.

[73] Assignee: Appleton Papers Inc., Appleton, Wis.

[21] Appl. No.: 660,894

[22] Filed: Jun. 10, 1996

Related U.S. Application Data

[60] Provisional application No. 60/002,092 Aug. 10, 1995.

[51] Int. Cl.$^6$ .................................................. B32B 9/00
[52] U.S. Cl. .................... 428/537.5; 428/17; 428/34.6; 428/35.9; 428/139; 428/147; 428/224; 428/289; 428/326; 428/913; 47/9; 47/25; 47/32; 47/73; 47/48.5
[58] Field of Search .................... 428/34.2, 34.6, 428/35.7, 147, 537.5, 913, 326, 323, 17, 542.8, 139, 198, 224, 289; 47/9, 56, 79, 78, 32, 25, 48.5, 73

[56] References Cited

U.S. PATENT DOCUMENTS

| | | |
|---|---|---|
| 3,516,941 | 6/1970 | Matson . |
| 3,623,266 | 11/1971 | Nakayama . |
| 3,810,328 | 5/1974 | Bryan, Jr. et al. ............... 47/9 |
| 3,859,125 | 1/1975 | Miller et al. . |
| 3,938,280 | 2/1976 | Vandemark et al. ............ 47/9 |
| 3,939,606 | 2/1976 | Vandemark et al. ............ 47/9 |
| 3,940,884 | 3/1976 | Mason, Jr. . |
| 4,066,490 | 1/1978 | Yoshimi . |
| 4,081,264 | 3/1978 | Ali . |
| 4,100,103 | 7/1978 | Foris et al. . |
| 4,379,655 | 4/1983 | Brost et al. . |
| 4,403,443 | 9/1983 | Valente . |
| 4,539,038 | 9/1985 | Gombert . |
| 4,580,960 | 4/1986 | Apman et al. . |
| 4,584,790 | 4/1986 | Gaughen . |
| 4,627,191 | 12/1986 | Bergere . |
| 4,686,790 | 8/1987 | Lahalih et al. . |
| 4,782,626 | 11/1988 | Shanley et al. . |
| 4,793,474 | 12/1988 | Drake . |
| 4,794,726 | 1/1989 | Fawcett et al. . |
| 4,910,911 | 3/1990 | Ahm . |
| 5,065,543 | 11/1991 | Brook . |
| 5,139,566 | 8/1992 | Zimmerman . |
| 5,163,247 | 11/1992 | Weber et al. . |
| 5,191,734 | 3/1993 | Weber et al. .................... 47/9 |

FOREIGN PATENT DOCUMENTS

| | | |
|---|---|---|
| 42424/85 | 5/1985 | Australia . |
| 1209059A | 7/1984 | U.S.S.R. . |
| 1607713A1 | 4/1988 | U.S.S.R. . |
| 1434042 | 7/1973 | United Kingdom . |

OTHER PUBLICATIONS

Biodegradable Liquid Polymers as Soil Mulches for Tomatoes, Everett, P.H., 1 p. 1976.
Comparison of Polyethylene-Coated Paper and Polyethylene for Mulching Vegetables, Courter, J.W.; Hopen, H.J.; Vandemark, J.S., pp. 126–129 1968.
Controlled Release Herbicides, Schreiber, M.M.; Shasha, B.S.; Trimnel, D; White, M.D., pp. 177–191 ARAC Report Proj. I-7337: Doc. Ref. 6.2.
Effect of Fertilization and Mulching with Bio-Degradeable Polyethylene-Coated Paper On Responses of Okra and Peppers, Albregts, E.E.; Howard, C.M., pp. 36–38 1973.
Effect of Paper and Polyethylene Mulches and Plastic Caps On Cantaloupe Yields and Earliness, Clarkson, V.A.; Frazier, W.A., pp. 400–404 1956.
Effect of Paper Mulches On Soil Temperature, Soil Moisture, and Yields of Certain Crops, Smith Alfred, pp. 159–201 1931.
Evaluation of Paper and Polyethylene-Coated Paper Mulches and Fertilizer Rates for Tomatoes, Everett, Paul H., pp. 124–128 1971.
Mulch Paper In Vegetable Production, Hutchins, A.E., pp. 1–20 1933.
Mulches for Commercial Vegetable Production, Schales, F.D., 6 pages.
Natural Polymers Control Pesticide Release, Worthy, Ward, p. 18 1976.
Paper Mulch for Muskmelons in Low Rainfall Areas, Peavy, W.S., p. 192.
Paper Mulch for Pineapples, Savage, C.G.; Barnett, G.B., pp. 335–336 1934.
Paper Mulch for the Vegetable Garden, Magruder, R., pp. 1–60 1930.
Polyethylene-Coated Urea. 2 Urea Release as Affected by Coating Material, Soil Type, and Temperature, Salman, O.A.; Hovakeemian, G.; Khraishi, N., pp. 633–638 1989.
Permeability of Plastic Films to Fumigants, Kolbezen, M.J.; Abu-El-Haj, F.J., pp. 476–481.
Results of Paper Mulch Experiments with Vegetable Crops, Thompson, H.C.; Platenius, H., pp. 305–309.
Starch-Based Plastics and Related Products for Agriculture, Otey, F.H., pp. 77–81, ARAC Report Proj. I-7337: Doc. Ref. 6.21.
Starch-Based Polymers for Agricultural Applications, Doane, W.M., pp. 103–104, ARAC Report Proj. I07337: Doc. Ref. 6.17.
Tomato Production as Affected by Two Weights of Polyethylene Coated and Uncoated Kraft Paper Mulch, with and without Fungicide-Herbicide Impregnation, Burgis, D.S., pp. 147–152.
Vegetable Crop Responses to Synthetic Mulches, College of Ag., Univ. of Il @ Urbana–Champaign, pp. 2–34.

(List continued on next page.)

*Primary Examiner*—Patrick Ryan
*Assistant Examiner*—Abraham Bahta
*Attorney, Agent, or Firm*—Benjamin Mieliulis

[57] ABSTRACT

A novel agricultural mulch is disclosed comprising a paper substrate having coated thereon on the top and bottom side film forming latexes resistant to water permeability. The superior paper mulch according to the invention is degradable but possesses most of the beneficial aspects of polyethylene-type mulches.

24 Claims, No Drawings

OTHER PUBLICATIONS

Water Repellent Soil Mulch for Reducing Fertilizer Nutirent Leaching: II. Variables Governing the Effectiveness of a Siliconate Spray, Snyder, G.H.; Ozaki, H.Y.; Hayslip, N.C., pp. 678–681.

Wet Tensile Breaking Strength of Paper and Paperboard, No Author/Approved by Physical Properties Committee of the Process & Product Quaility Division, pp. 1–3 1987.

Tensile Breaking Properties of Paper and Paperboard (Using Constant Rate of Elongation Apparatus), No Author/Approved by Physical Properties Committee of the Process & Product Quaility Division, pp. 1–5 1988.

Surface Wettability of Paper (Angle of Contact Method), No Author/Approved by Physical Properties Committee of the Process & Product Quaility Division, pp. 1–5 1989.

MULCHING COMPOSITE

This application under 35 USC 111(a) claims benefit per 35 USC 119(e) to application Ser. No. 60/002,092 filed Aug. 10, 1995, now abandoned as a provisional application per 35 USC 111(b).

BACKGROUND OF THE INVENTION

1. Field of Invention

This invention relates to agricultural articles, and more particularly, to a degradable mulch composite that has film-like qualities of polyethylene-type mulches but additionally has the degradability characteristics of papers.

2. Description of Related Art

Agricultural much films are used extensively throughout the world because of the many advantages they provide, including fertilizer retention, fumigant retention, retarded weed growth, increased soil retention of moisture and heat, and reduced soil erosion by winds and rain. Such mulching films also enhance soil structure by preventing soil crusting and soil compaction.

Polyethylene film both in a transparent state and an opaque state, has been the most common synthetic mulch to be used. However, polyethylene film is not degradable and it must be removed from the field and be burned, buried or otherwise discarded at the end of its useful life. The removal and burying or burning of plastic mulch is both costly and has an adverse effect on the ecology. There exists a need for a mulch that would decompose at the end of a growing season. Attempts to meet this need have led to the development of a variety of biodegradable and photodegradable mulch films. For example, Otey et al., U.S. Pat. No. 3,949,145 developed a biodegradable plastic film from starch, polyvinyl alcohol and glycerol, which film is covered with a water-resistant resin coating to prevent premature degradation. The water-resistant resin coating is prepared from a water-resistant resin, such as plasticized polyvinyl chloride, and poly-toluene diisocyanate prepolymer bonding agent.

Another biodegradable mulch film, disclosed by Clendinning, U.S. Pat. No. 3,929,937, is fabricated from a blend of a particulate addition polymer, such as polyethylene, in a matrix of biodegradable thermoplastic oxyalkanoyl polymer, such as ε-caprolactone homopolymer. Additional ingredients can be included in the blends. Such additional ingredients include naturally occurring biodegradable products, e.g., tree bark, sawdust, peat moss, cotton seed hulls, and the like, fibrous and non-fibrous fillers, e.g., talc, limestone, bentonite, asbestos, and the like, plant nutrients, fertilizers, insecticides, pesticides, and the like.

In Iwasyk et al., U.S. Pat. No. 3,387,405, there is disclosed a continuous foam mulch which is produced by applying and substantially simultaneously gelling a fluid aqueous foam which comprises at least 0.5 weight percent of dissolved polyvinyl alcohol and at least 50 percent, based on the weight of the polyvinyl alcohol, of emulsified asphalt or wax.

Still other agricultural mulch films have been disclosed by Vigneault et al., U.S. Pat. No. 3,274,731, and Kane, U.S. Pat. No. 3,384,993. Vigneault et al, for example, discloses a mulch film comprised of at least one copolymer consisting essentially of ethylene and an ethylenically unsaturated carboxylic acid monomer such as acrylic acid, methacrylic acid, fumaric acid, maleic acid and the like. Vigneault et al. suggests that their films might also contain nutrients such as ammonia or phosphate-containing additives, and other fillers for various mulching uses. Kane also discloses a plastic mulch film that may include solid water-soluble nutrients such as ammonium nitrate, potassium chloride, potassium nitrate, potassium sulfate and urea. However, the only plastic mulch films disclosed by Kane am comprised of polyethylene, polypropylene, cellulose acetate, cellulose acetate butyrate, polyvinyl chloride acetate, styrene acrylonitrile, and the like. These plastic materials am not soluble in water and must, therefore, rely on some other mechanism to impart adequate degradability to that they may be used as an agricultural mulch film that does not have to be removed from the fields after the growing season. One such degrading mechanism is disclosed by Newland et al., U.S. Pat. No. 3,454,510. In that patent, it is taught to include a pro-oxidant in a water-insoluble polyolefin film, such as polyethylene, polypropylene or poly(butene-1). Among the pro-oxidants that are disclosed are certain metal acetyl acetonates, metal alkyl benzoylacetates, metal acetyl acetonates, metal stearates and metal oleates.

Alternatives to plastic mulching films have also included paper strip material for sowing seeds. Soviet Patent, SU 1209059A disclosed a paper strip material such as blotting paper to which seeds and fertilizers am applied. The outer surface of the strip material has a coating of herbicide. Seeds am sandwiched between two strips glued together. Another tube-like paper seed strip is disclosed in U.S. Pat. No. 3,623,266.

U.S. Pat. No. 5,916,992 assigned to Nissan discloses fertilizer sheet production by spreading granules of slow acting fertilizer over base paper coated with an adhesive. Japanese Patent #60025902, Feb. 2, 1985 assigned to Dainippon Jochugiku KK discloses an insecticidal paper which comprises paper coated with printing ink and binder containing volatile insecticide which is overcoated with a resin film. Coating used include nitrocellulose, polyamide, ethyl cellulose, acrylate resins, vinyl chloride-vinyl acetate copolymers, and urethane resins.

Japanese Patent #8647900, Mar. 8, 1986 assigned to Oji Paper Co., Ltd discloses a moisture impermeable controlled release insecticidal sheet. The sheets are made from kraft paper, rubber latex and waxes or waxy substances, and insecticides, fungicides and fungistat.

British Patent No. 1,434,042, discloses a water-soluble or water-dispersible paper made from polyvinyl alcohol on which or into which an active ingredient is incorporated.

U.S. Pat. No. 5,163,247 to Weber et al. discloses a porous fibrous cellulosic web at least partially saturated with latex at 30 dry parts per 100 parts fiber.

While the above-discussed mulch films, and others, have been used with some degree of success, no mulching film disclosed to date has been found to be completely satisfactory commercially in the balance of the important properties needed for a good agricultural mulch. These properties include, for example, good mechanical properties for application by machines and planting by machines, water resistance, field durability, the ability to retard weed growth, degradability and appropriate economics.

DETAILED DESCRIPTION

The present invention is a novel mulch composite comprising a paper substrate having first and second surfaces, and an adherent coating comprising a film-forming latex applied to the first and second surface of the paper substrate.

More particularly, the present invention is an agricultural mulch comprising an extensible paper substrate having a top and a bottom surface with a first coating provided on the top surface. The first coating comprises a latex. A second coating is provided on the bottom surface. The second coating comprises a latex and can include a biologically active material. The coatings generally have a thickness of less than 151 μm, The paper substrate generally should have a minimum thickness of at least 30 μm.

The agricultural mulch according to the invention is resistant to water penetration and permeability. Water permeability can be measured according to a test method for water permeability set forth in Example 1 herein, such that when said mulch is placed on the surface of water at ambient temperature, the mulch does not curl out of the plane of the surface of the water within 5 seconds of contact with the water.

The agricultural mulch comprises: a) an extensible paper substrate having a top surface and a bottom surface; b) a first coating on the top surface, said first coating comprising a film-forming latex resistant to water permeability, a pigment, and water repellant; c) a second coating on the bottom surface, said second coating comprising a film-forming latex, a pigment and a biologically active material; said extensible paper having an elongation of 5% or more in the machine and cross machine directions; said film forming latex comprising an oil in water emulsion forming a film at drying temperatures of less than 100° C.; said first coating having a coat weight of 6 to 12 pounds per ream of 3300 sq. ft. of the paper substrate (or about 8 to 18 g/m$^2$); said second coating being applied at a rate sufficient to form a coat weight of 6 to 12 pounds per ream of 3300 sq. ft. of the paper substrate (or about 8 to 18 g/m$^2$); said paper substrate preferably having a weight of at least 25 lbs. per ream of 3300 sq. ft. of the paper substrate; said water repellant providing the first coating with a water contact angle of at least 70° and preferably greater than 90°; said agricultural mulch being resistant to water permeability, as measured according to a test method for water permeability set forth in Example 1 herein such that when said mulch is placed on the surface of water at ambient temperature, said mulch does not curl out of the plane of the surface of the water within 5 seconds of placement in contact with the surface of the water.

The paper substrate can be formed on a paper machine such as a Foudrinier paper machine. Paper made on a paper machine as a result has machine and cross machine directions arising as a result of fiber orientation as pulp slurry is laid down on the forming wire.

The substrate is selected from paper of 25 to 65 lbs. and preferably of from 30 to 65 pounds per ream. A ream is 3300 sq. ft. of paper substrate. The paper substrate is thus from about 37 g/m$^2$ to 97 g/m$^2$.

Being largely paper yet resistant to water permeability when first applied, the agricultural mulch is advantageously biodegradable after the fruiting season.

The paper according to the invention has low air permeability in terms of passage of air through the paper. This parameter can be measured by the volume of air passing through the paper with a fixed time or time for a fixed volume of air to pass through the paper.

The barrier property of the mulch can be measured by methods such as by a Gurley™ porosity test instrument in accordance with TAPPI test method T460-on-88 which measure the time required in seconds to displace 100 cubic centimeters of air through an area of 6.4 sq. cm.

The mulch according to the invention is a nonporous structure. The substrate is not saturated by the latex coating, instead the film-forming latex is applied as coatings on the top and bottom surface of the substrate typically from 6 to 12 pounds based on a ream of 3300 sq. ft. of the paper substrate (or about 8 to 18 g/m$^2$). The paper substrate would have a weight of from 25 to 65 pounds per ream of 3300 sq. ft. of the paper substrate (or about 37g/m$^2$ to about 97 g/m$^2$).

The agricultural mulch according to the invention is a nonporous structure and not saturated with the latex. Porosities of the agricultural mulch of the invention exceed 5000 seconds per 100 cubic centimeters of air displacement for a single sheet.

The ratio of wet tensile strength to dry tensile strength of the agricultural mulch of the invention is from 0.9 to about 1.7. The agricultural mulch of the invention does not lose appreciable strength upon wetting. The ratios even suggest some strength gain. All of the tests including the wet strength, porosity, water permeability and contact angle tests should be performed on freshly manufactured samples, rather than aged samples.

The test methods used for determining dry tensile strength was TAPPI method T 494 om-88, "Tensile breaking properties of paper and paperboard (using constant rate of elongation apparatus)." The test method for determining wet tensile strength was TAPPI method T 456 om-87 "wet tensile breaking strength of paper and paperboard." (The samples in the following table were prepared according to Example 2.)

| SAMPLE ID | WET TENSILE STRENGTH (MD) | DRY TENSILE STRENGTH (MD) | MD WET TENSILE/ DRY TENSILE | WET TENSILE STRENGHT (CD) | DRY TENSILE STRENGTH (CD) | CD WET TENSILE/ DRY TENSILE |
|---|---|---|---|---|---|---|
| 2268 | 56.1 | 37.7 | 1.5 | 25.8 | 30.2 | .09 |
| 2269 | 37.5 | 42.0 | 0.9 | 27.0 | 23.2 | 1.2 |
| 2306 | 54.3 | 43.0 | 1.3 | 30.5 | 28.2 | 1.1 |
| 2307 | 50.5 | 44.3 | 1.1 | 24.8 | 32.1 | 0.8 |
| 2351 | 58.3 | 40.4 | 1.4 | 36.8 | 25.2 | 1.5 |
| 1016 | 54.8 | 43.1 | 1.3 | 33.4 | 24.0 | 1.4 |
| 1017 | 47.5 | 42.8 | 1.1 | 28.7 | 24.4 | 1.2 |
| 1018 | 56.7 | 53.3 | 1.1 | 32.6 | 22.5 | 1.4 |
| 1019 | 51.7 | 49.4 | 1.0 | 27.6 | 22.9 | 1.2 |
| 1020 | 50.7 | 42.3 | 1.2 | 26.4 | 26.9 | 1.0 |
| 1021 | 52.9 | 43.8 | 1.2 | 35.0 | 24.4 | 1.4 |
| 1101 | 58.5 | 44.8 | 1.3 | 34.8 | 27.6 | 1.3 |
| 1102 | 56.3 | 43.9 | 1.3 | 32.8 | 27.5 | 1.2 |
| 1103 | 48.6 | 44.9 | 1.1 | 32.0 | 25.7 | 1.2 |
| 2505 | 58.5 | 35.0 | 1.7 | 23.9 | 27.5 | 0.9 |

The ratio of wet strength tensile to dry strength tensile for purposes of their invention and the claims is determined in the machine direction of the paper substrate. Cross machine direction (CD) values were found generally consistent with the machine direction (MD) tests as is reflected in the preceding table. For consistency, and for purposes of the claims, the tensile testing should be in the machine direction (MD).

Paper includes paper, paperboard, kraft pulp, as ground wood, mechanical pulp, or chemical pulp including soda process pulp, sulfite process pulp, and sulfate process pulp, whether bleached or unbleached. Use of unbleached pulp is favored because of its lignin content for producing an agricultural mulch.

For purposes of the invention extensible paper is preferred. Extensible paper typically has more paper machine direction strength. Extensible paper would have typically have 5% or more stretchability in the machine and cross machine directions. The ability of the paper to stretch reduces tearing or breaking during the mechanical operations of laying, covering the edges of the mulching composite, and planting by machine.

Extensible paper is a stretchable paper and is advantageously used in the invention by being able to conform to the surface to which it is applied. Extensible paper can be made by a variety of methods such as the Clupak process, Expando process or Mikrokrep process. Such processes are disclosed in patents such as U.S. Pat. No. 3,362,869 and 3,329,562 incorporated herein by reference.

Elongation is determinable by standard methods such as TAPPI T 404 em- 92 and more preferably TAPPI Useful Method 457 "Crepe in Paper (Stretch on Rule)".

The agricultural mulch paper substrate has side edges and end edges. Typically the substrate is a long roll unwinding into a rectangular strip the length of a furrow for planting. A preferred variation involves coating the side edges with a latex material, preferably the same film-forming latex as in the first or second coating.

The side edges can be conveniently coated while the substrate material is in roll form by lightly painting or spraying the latex onto the sides of the roll before unwinding. Dow 620 or Genflo 5068 was preferred. The end edges of the rectangular strip can be optionally coated with the latex.

The film-forming latex for the top and bottom coats is an elastomeric latex, such as styrene butadiene latex. Carboxylated styrene butadiene latex such as Dow 620 or Genflo 5068 was preferred.

The latex is a water emulsion of a film-forming material. Latexes are dispersions of either elastomeric or amorphous thermoplastic polymer particles in water. These are typically oily droplets or low molecular weight oligomers. The lattices useful in the invention must be capable of forming a continuous film that is resistant to water permeability.

Lattices useful in the invention are oil in water emulsions forming a film at drying temperature of less than 100° C. Emulsions of low molecular weight oligomers that form films at less than 100° C. are such oil in water emulsions for purposed of this invention.

Latexes with rubber character were found most likely to meet the criteria of the invention. Latices such as polyvinyl chloride, for example, Air Products Airflex 4530 which is ethylene vinyl chloride was found to not meet the water permeability test. Polyvinylide chloride as a homopolymer similarly lacks sufficient rubber character. Copolymeriztion of such homopolymer with polymers with more rubber character may increase the likelihood of meeting the criteria of the invention. polychloroprene which has repeating units of 2-chloro-1,3-butadiene has more rubber character and would accordingly be expected to be functional.

The main elastomeric latexes useful in the invention are: styrene butadiene, carboxylated styrene butadiene, natural rubber latex, neoprene nitrile, carboxylated acrylonitrile butadiene styrene, styrene acrylic, polyacrylonitrile butadiene, acrylonitrile, polystyrene, polyacrylics, or their copolymers.

Lattices am typically colloidal dispersions of polymers prepared by direct emulsification of the bulk polymer in an aqueous medium. Such lattices are generally stabilized by surfactants.

For industrial purposes, lattices are often produced by emulsion polymerization. A monomer or mixture of monomers is emulsified in water and polymerization is induced in the aqueous phase by an initiator. Surfactants are useful in emulsion polymerization. Their absorption at the interface lowers the interfacial tension between the dispersed and continuous phases and surrounds the particles with a firmly-bound water envelope, stabilizing the emulsion against coagulation. The absorbed layers of amphipathic surfactants are oriented in such a way that their hydrophilic polar heads are pointing into the continuous phase, while the hydrophobic nonpolar tails are anchored in the dispersed phase. Various elastomeric latexes are available commercially.

To the polymer in a stable aqueous dispersion, modifying additives such as plasticizers and fillers may be added to the latex to alter the properties of a coating produced by application of the modified dispersion or latex.

For the agricultural mulch of the invention, addition of hydrophilic polymers to either the top or bottom coating is not desired in that the water permeability characteristics would typically be adversely affected. Nevertheless, to facilitate coating hydrophilic polymers such as starches or carboxylated methyl cellulose can be added to the coatings in a rheologically effective amount.

The first coating on the top surface should have a water contact angle of at least 50°. Preferably, the top coat of the agricultural mulch has a water repellant added to it to increase the water angle of contact to at least 70°. A method for determining angle of contact is set forth in TAPPI method T458 om-89. The interior angle between the baseline of the drop of water and the tangents to the curve at the point of contact with the base line is the angle of contact. The angle of contact (C) at 5 seconds determined by said TAPPI method is intended as the angle of contact measurement for purposes of this invention.

The water repellant can be selected from compounds such as paraffin wax, Thompson water sealant, fluorinated compounds such as Scotchban, silicones, and the like. Examples of suitable fluorinated compounds are set forth in U.S. Pat. Nos. 4,074,009 and 3,574,791 incorporated herein by reference. The Thompson water sealant, a common wood deck surface treatment, was preferred.

In the coatings of the instant invention there can also be included pigments, such as those described on fillers in the "Encyclopedia of polymer Science and Technology," John Wiley & Sons, Inc., New York: Fillers, Vol. 6, page 740. Suitable pigments include, but are not limited to, water insoluble silicates, oxides, clays, calcined clays, carbon black, carbonates, silicates, sulfates, sulfites, diatomaceous earth, and polymeric fibers. Other such pigments that can be added to the latex preferably include clays such as ansilex clays, urea-formaldehyde pigments, titanium dioxide, silicone dioxide, talc, aluminum hydroxide, and calcined kaolin clay.

Binders can include polyvinyl alcohol, hydroxyethylcellulose, methylcellulose, methylhydroxypropylcellulose, starch, modified starch, and gelatin.

Typical plasticizers that can be advantageously used include those selected from the group consisting of phthalates, phosphates, citrates, adipates, tartrates, sebacates, succinates, glycolates, glycerolates, benzoates, myristates, polyethylene glycols, polypropylene glycols, and halogenated phenyl. Generally, from 0.001 to 50 parts of a plasticizer or a mixture of plasticizers are incorporated into 100 parts of latex.

The mulching composite of the invention is not water permeable when manufactured. Under field conditions, the contact angle of water in contact with the film was observed to decrease over time and porosity increased reflecting an increase in hydrophilic character or water permeabilty. The bottom coating becomes permeable faster than does the top coat allowing moisture penetration to the paper fibers. The top coating is much slower to change from hydrophobic to a hydrophilic character, thus giving rise to a "diode" type of effect. The coated paper becomes permeable in one direction and impermeable to water in the opposite direction. A quantity of water becomes held in the paper fibers facilitating the biodegradation process.

Surfactants can be added to the coat-forming material to regulate the surface energy of the dispersed polymer and thereby improve the blending and dispersion of the polymer and other additives into a composite. Anionic, cationic, nonionic or amphoteric surfactants, including sulfated, sulfonated, or carboxylated esters, amides, alcohols, ethers, aromatic hydrocarbons, aliphatic hydrocarbons, acylated amino acids and peptides can be used. Ditertiary acetylene glycol was preferred. Examples of surfactants include potassium laureate, sodium alkylsulfates such as sodium dodecyl sulfate, hexadecylsulphonic acid, sodium dioctylsulphosuccinate, hexadecyl(cetyl) trimethylammonium bromide, dodecylpyridinium chloride, dodecylamine hydrochloride, N-dodecyl-N, N-dimethyl betaine, bile acids and salts, acacia, tragacanth, polyoxyethylated nonylphenols (Igepal), sorbitol esters (Spans), polysorbates (Tweens), polyoxyethylated octylphenols (Triton-X analogs), polyoxyethylene lauryl ethers, polyoxyethyleneacetyl ethers, polyoxyethylene stearyl ethers, polyoxyethylene oleyl ethers (Brij analogs), polyoxyethylene stearates (Myrj analogs), poloxamer and poloxamine type polyoxyethylene-polyoxypropylene derivatives (pluronics and tetronics). Suitable surfactants can be selected for blending with coat-forming materials by using the surfactant's hydrophile/lipophile balance number, HLB, which represents the proportion between the weight percentages of hydrophilic and lipophilic groups in a surfactant. The higher the HLB, the more hydrophilic the surfactant and the lower the number the more lipophilic the surfactant. The required HLB number for blending coat forming materials is determined by selecting a surfactant with a known HLB number, blending it with the materials and observing the results. A uniform composite is formed with the correct HLB number while a non-uniform mixture indicates a different number is needed. This new number can be selected by using the prior HLB number as a guide. The HLB number is known to the art for many surfactants, and they can be experimentally determined. Generally a HLB number of 10 or less indicates lipophilic behavior and 10 or more indicates hydrophilic behavior. Also, HLB numbers are algebraically additive. Thus, by using a low number with a high number, blends of surfactant can be prepared having numbers intermediate between the two numbers. The concept of HLB is detailed in Remington's Pharmaceutical Sciences, 16th Ed., Mack Pub. Co., (1980), pages 316–319. The amount of surfactant needed is an amount that when blended with a coat-forming materials will form the desired coat composite, and it will vary according to the particular surfactant and materials that are blended to form the coating. Generally, the amount of surfactant will range from about 0.001 part up to 40 parts for 100 parts of coating.

The process to produce the desired coat formulation involves the addition to the latex of plasticizer, surfactant and any other desirable additives and pigments, such as carbon black and mixing with a high shear mixer. Coating can be accomplished using conventional coating apparati and techniques. Application via an air knife is found to produce a coating that better follows the raised contours of the surface of the substrate. Solids as high as practical to form a coherent latex film is desired.

To the underside or bottom of the substrate is coated together with the latex a biologically active material. This active material can be selected from one or more of herbicide, bactedcide, fungicide, insecticides, nematocides, nutrients, trace elements, vitamins, pheromones or fertilizer. The active material is adhered to the bottom of the latex coated substrate preferably in or on a water-soluble carrier or binder such as starch.

Examples of useful herbicides include alachlor, aptam, flurochloridone, vernolate, trifluralin, 2,4-D, diquat, paraquat, hexazinone, fomesafen, metribuzin.

Examples of useful insecticides include pirimiphosmethyl, methoprene, fonofos, trefluthrin, methyl parathion, ethyl parathion, permethrin, pyrethrin, fenithrothion, chlorpyriphos, diazinon, cycloheximide, chlorpyriphos, phorate, carbosulfan, enpethrin. Rodenticides include warfarin. Examples of useful fungicides include copper-8-quinolinolate, copper sulfate, tributyltin fluoride, diclobutrazol, ethirimol, flutriafol. Examples of pheromones include compounds such as Z, ZZ E 7, 11-hexadecadienyl acetate.

The fungicide such as copper-8-quinolinolate, can be included in either the bottom coating or more advantageously impregnated into the paper substrate or incorporated in the papermaking process at the head box to serve as a paper fungicide to slow degradation of the paper.

Fertilizers include urea and other nitrogen-containing compounds which help promote plant growth. Nutrients can include materials such as urea, phosphates, potassium salts and complexes, trace metals or their salts, nitrogenous compounds, nitrate salts and others in their simple or complex form. The various nutrients can include some or all of the nutrients required for the crop during the growing season.

If desired, the biologically active material can be microencapsulated and included in or on the coating on the bottom side of the substrate. A binder material such as starch, hydroxyethylcellulose, methylcellulose, gelatin then often is needed. Often the film forming latex itself can also act as the binder material. Microencapsulating the biologically active material has the advantages of adding timed release capabilities and longer field life to the active material or stability and carry through processing and storage.

Microencapsulation methods which are useful are the polymerization of urea and formaldehyde, or monomeric or low molecular weight polymers of dimethylol urea or methylated dimethylol urea, melamine and formaldehyde, monomeric or low molecular weight polymers of methylol melamine or methylated methylol melamine in an aqueous vehicle as taught by Brown et al., in U.S. Pat. No. 4,552,811, incorporated herein by reference, also gelatin capsules and capsules produced by interfacial polymerization. Gelatin capsules are well known taught in such patents as U.S. Pat. Nos. 2,800,457; 3,041,289; and 3,533,958; incorporated herein by specific references. Gelatin capsules are preferred. Encapsulation methods of various types are disclosed in U.S. Pat. Nos. 4,277,364; 3,516,941; 4,001,140; 3,755,190; and 4,087,376.

EXAMPLES

Example 1. Test Method for Water Permeability

This test measures resistance to water permeability. An uncoiled cut sheet of paper that lays flat has equalized stresses on each side of the paper. This is under normal conditions of temperature and humidity. When an aqueous coating is applied to one side of the paper and the coating dried in a hot oven, the coated side typically develops considerable stress causing the paper to curl in the direction of the coating. The curl is also in the cross machine direction. Decurling techniques can be applied to the paper to offset the tendency to curl. Such techniques can include steaming, and rewetting the sheet. Curl can still become evident at high humidity or in direct contact with water.

sheet must not be allowed to touch the sides of the container. After the sample is allowed to float, visual observation is then made in 5 seconds as to evidence of curling of the flat sample out of the plane of the surface of the water. The time for an edge to lift above the water plane is measured. The test is repeated with a second four square inch sample (2 inch×2 inch) bottom side up. Only samples that remain substantially visually flat in the plane of the surface of the water during the first five (5) seconds are acceptable for purposes of this invention in terms of resistance to water permeability. For purposes of this invention, both sides of the agricultural mulch must pass this test.

Most latexes were found not to pass this simple yet elegant test. Permeable latexes allow water to penetrate to the paper substrate. Internal stresses in the paper immediately give rise to curling of the sheet out of the plane of the surface of the water.

When the coated paper is an excellent barrier to water permeability, the paper will be observed to have no upward curl and will remain flat on the water even for extended times with only a little waviness near the cut edges. Coatings that are partial barriers curl out of the plane of the surface of the water. The rapidity of curl and tightness of the spool formed correlate well with the degree of water permeability of the coating. More permeable coatings tend to form faster and tighter spools. If samples are not cut parallel with the direction of the coating, the sample tends to twist during curling making it difficult to follow the curling process.

| Observations | Control* No Coating, Bottom | (a) Bottom Coat 30% starch; 48% Clay; 20% CuQ | (b) Bottom Coat 60% latex; 20% Clay; 20% CuQ | (c) Bottom Coat 38% latex; 37% Clay; 20% CuQ | (d) Bottom Coat 50% latex; 10% starch; 20% Clay; 20% CuQ | (e) Bottom Coat 38% latex; 47% Clay; 10% CuQ |
|---|---|---|---|---|---|---|
| Swelling-edges starting to lift | 2 sec. | 2 sec. | No | 1 min. 15 sec. | 25 sec. | 30 sec. |
| Edges lift above H₂O surface | 3 sec. | 5 sec. | No | No | 45 sec. | 1 min., 20 sec. |
| Loose spool | Yes | Yes | No | No | No | No |
| Tight spool | Yes | Yes | No | No | No | No |

A useful test for water permeability for purposes of this invention is to place a sample of the coated paper in contact with water by floating the sheet onto the surface of water. The fibers absorb water very rapidly (less than five seconds). The associated fiber swelling and water absorption produced stress in the sheet and the paper curls out of the plane of the surface of the water. In many cases the paper can be observed to actually form a tight wound spool. If the paper is left in this environment eventually all the fibers swell, the stresses release with time and the damp or wet paper once again lays flat.

The initial out of the plane deformation when the paper is floated onto the surface of water has been found to be a convenient and useful screening tool.

PROCEDURE (Test Method for Water Permeability)

A four square inch sample (2 inch×2 inch) cut parallel with the direction of coating, is taken of the latex coated flat sheet material to be tested. A clear beaker of water to a depth of at least 1 cm at approximately room temperature (20° C.) is provided. The 2 inch by 2 inch square sample top side up is placed on the surface of the water and floated in the center of the beaker so as not to be drawn to the edge where the water surface tension can be broken. The coating side desired to be tested is placed in contact with the water. The Example 2.

An agricultural mulch according to the invention was prepared as follows:

|  | % SOLIDS | WEIGHT (g) | DRY WEIGHT | % COATING SOLIDS |
|---|---|---|---|---|
| COPPER-8-QUINOLINOLATE DISPERSION |  |  |  |  |
| POLYVINYL ALCOHOL | 20% | 72.5 | 14.5 | 14.5% |
| SURFYNOL 104 | 100% | 0.4 | 0.4 | 0.4% |
| NOPCO NDW | 100% | 0.1 | 0.1 | 0.1% |
| COPPER-8-QUINOLINOLATE | 100% | 85.0 | 85.0 | 85.0% |
| WATER |  | 42.0 |  |  |
| TOTALS SOLIDS = 50.0% |  | 200.0 | 100.0 | 100.0% |

-continued

| MATERIAL | % SOLIDS | WEIGHT (g) | DRY WEIGHT | % COATING SOLIDS |
|---|---|---|---|---|
| Coating On Top Surface | | | | |
| (CLAY SLURRY) KLONDYKE | | 39.1 | 26.6 | 35% |
| CARBON BLACK | 38% | 10.0 | 3.8 | 5% |
| DOW 620 LATEX | 50% | 91.2 | 45.6 | 60% |
| WATER | | 59.7 | | |
| TOTALS SOLIDS = 68% | 38.0% | 200.0 | 76.0 | 100% |
| Coating On Bottom Surface | | | | |
| (CLAY SLURRY) KLONDYKE | 68% | 41.8 | 28.4 | 37.4% |
| CARBON BLACK | 38% | 10.0 | 3.8 | 5.0% |
| COPPER-8-QUINOLINOLATE | 50% | 26.8 | 13.4 | 17.6% |
| DOW 620 LATEX | 50% | 60.8 | 30.4 | 40.0% |
| WATER | | 60.8 | | |
| TOTALS SOLIDS = 38.0% | | 200.0 | 76.0 | 100.0% |

Nopco NDW is a sulfonated castor oil available from Nopco Chemical Company. Surfynol 104 is a ditertiary acetylene glycol surface active agent. Dow 620 latex is a carboxylated styrene butadiene latex.

The coatings were formulated at 38% solids, then coated onto 55#/3300 sq. ft. ream extensible kraft paper. The basepaper contained a wet strength additive such as alkyl ketene succinic anhydride, Hercon 70™, Hercules Corp., or alkenyl succinic anhydride. The first coating was applied with a #5 wire wound Meyer rod to provide a coat weight between 7.5 and 8.5 lbs./ream. After the coating is applied the wet sheet is placed in an oven at 100° C. for approximately 2 minutes. The second coating is then applied in a similar manner, to the opposite side of the base sheet. The topside coating was applied first and the soil side coating second for manufacturing convenience.

An alternative method used to prepare the agricultural mulch method is to split the copper-8-quinolinolate concentration evenly between the two sides, applying one half of the total preservative concentration in each of the latex/clay coatings. When altering the copper-8-quinolinolate concentration in the two latex coatings, the concentration of the latex and carbon black remain constant; the amount of clay is varied to accommodate the change in copper-8-quinolinolate concentration.

Still a third method of preparing the paper mulch product is to apply the copper-8-quinolinolate preservative in a separate step prior to separately coating the latex layer. The copper-8-quinolinolate thus has more intimate contact with the cellulose fibers of the paper substrate making it a constituent of the paper. This can be accomplished by use as a filter or as a size press application as part of the paper making process or as a separate coating process. Coating with copper-8-quinolinolate can be accomplished using the following formulation:

| MATERIAL | % SOLIDS | WEIGHT (g) | DRY WEIGHT | % COATING SOLIDS |
|---|---|---|---|---|
| COPPER-8-QUINOLINOLATE DISP. | 40.0% | 47.0 | 18.8 | 82% |
| VINOL 203 PVA | 20.0% | 20.0 | 4.0 | 18% |
| ISOPROPYL ALCOHOL | | 120.0 | | |
| WATER | | 430.0 | | |
| TOTALS SOLIDS = 3.8% | | 600 | 22.8 | 100% |

The copper-8-quinolinolate, if desired to be separately applied, is applied with a #5 wire wound Meyer rod to both sides of the base sheet. One side is coated and dried at 100° C. for 2 minutes, the process is repeated applying the coating to the other side of the sheet. The result is approximately 0.6 lbs./ream of copper-8-quinolinolate on each side of the sheet and is equivalent to the copper-8-quinolinolate concentration that results in the versions wherein the copper-8-quinolinolate is placed in the bottom or top coat.

Over this copper-8-quinolinolate impregnated sheet latex coatings are applied as described above. The difference is that copper-8-quinolinolate can be omitted from the latex coatings since already present in the base sheet. Changes in copper-8-quinolinolate concentration in the latex coating can be readily accommodated to achieve a certain solid content by adjusting the amount of clay pigment.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive variations and changes can be made by those skilled in the art without departing form the spirit and scope of the invention.

What is claimed is:

1. An agricultural mulch comprising:

a) an extensible paper substrate having a top surface and a bottom surface;

b) a first coming on the top surface, said first coming comprising a film-forming latex resistant to water permeability, and a pigment;

c) a second coming on the bottom surface, said second coming comprising a film-forming latex resistant to water permeability and, a pigment;

said extensible paper having an elongation of at least 5% in the machine and cross machine directions of formation of the paper substrate;

said film-forming latex comprising an oil in water emulsion forming a film at drying temperatures of less than 100° C.;

said first coating sufficient to form a coat weight of 8 to 18 grams per sq. meter of the paper substrate;

said second coating sufficient to form a coat weight of 8 to 18 grams per square meter of the paper substrate;

said paper substrate having a weight of from 37 to about 97 grams per sq. meter of the paper substrate;

said first coating having a water contact angle of at least 50°;

said agricultural mulch having a ratio of wet tensile strength to dry tensile strength of from 0.9 to about 1.7;

said agricultural mulch coated top and bottom surfaces being resistant to water permeability, as measured according to a test method for water permeability set forth in Example 1 herein such that when said agricultural mulch is placed on the surface of water at ambient temperature, said agricultural mulch does not curl out of the plane of the surface of the water within 5 seconds of placement in contact with the surface of the water.

2. The agricultural mulch according to claim 1 wherein the latex is a carboxylated styrene butadiene latex.

3. The agricultural mulch according to claim 1 wherein the latex is a styrene butadiene latex.

4. The agricultural mulch according to claim 1 wherein the pigment is selected from the group consisting of carbon black, clay, calcium carbonate, urea formaldehyde pigment, and calcined clay.

5. The agricultural mulch according to claim 1 wherein the latex on the bottom surface includes, in addition, a biologically active material selected from the group of biologically active materials comprising herbicide, plant nutrient, trace element, pheromone, insecticide, fungicide and fertilizer.

6. The agricultural mulch according to claim 1 wherein the paper substrate includes copper-8-quinolinolate as a constituent of the paper.

7. The agricultural mulch according to claim 1 wherein the first and second coatings in addition contain a binder.

8. An agricultural mulch comprising:
a) an extensible paper substrate having a top surface and a bottom surface;
b) a first coating on the top surface, said first coating comprising a film-forming latex resistant to water permeability, a pigment, and water repellent;
c) a second coating on the bottom surface, said second coating comprising a film-forming latex resistant to water permeability, a pigment, and a biologically active material;
said extensible paper having an elongation of at least 5% in the machine and cross machine directions of formation of the paper substrate;
said film-forming latex comprising an oil in water emulsion forming a film at drying temperatures of less than 100° C.;
said first coating sufficient to form a coat weight of 8 to 18 grams per sq. meter of the paper substrate;
said second coating sufficient to form a coat weight of 8 to 18 grams per sq. meter of the paper substrate;
said paper substrate having a weight of at least 37 grams per sq. meter of the paper substrate;
said agricultural mulch having a ratio of wet strength tensile to dry strength tensile of 0.9 to about 1.7;
said water repellent providing the first coating with a water contact angle of at least 70°;
said agricultural mulch coated top and bottom surfaces being resistant to water permeability, as measured according to a test method for water permeability set forth in Example 1 herein such that when said agricultural mulch is placed on the surface of water at ambient temperature, said agricultural mulch does not curl out of the plane of the surface of the water within 5 seconds of placement in contact with the surface of the water.

9. The agricultural mulch according to claim 8 wherein the paper substrate is selected from paper having a weight of from 37 grams to about 97 grams per sq. meter.

10. The agricultural mulch according to claim 8 wherein the latex is a carboxylated styrene butadiene latex.

11. The agricultural mulch according to claim 8 wherein the latex is a styrene butadiene latex.

12. The agricultural mulch according to claim 8 wherein the pigment is selected from the group consisting of carbon black, clay, calcium carbonate, urea formaldehyde pigment, and calcined clay.

13. The agricultural mulch according to claim 8 wherein the biologically active material is selected from the group of biologically active materials comprising herbicide, plant nutrient, trace elements, pheromone, insecticide, fungicide and fertilizer.

14. The agricultural mulch according to claim 13 wherein the biologically active material is microencapsulated.

15. The agricultural mulch according to claim 8 wherein the water repellant is selected from paraffin wax and polyfluorocarbon.

16. The agricultural mulch according to claim 8 wherein the biologically active material is copper-8-quinolinolate.

17. An agricultural mulch comprising:
a) an extensible paper substrate having a top surface, and a bottom surface, with side edges and end edges defining the perimeter of the sheet;
b) a first coating on the top surface, said first coating comprising a film-forming latex resistant to water permeability, a pigment, and water repellant;
c) a second coating on the bottom surface, said second coating comprising a film-forming latex, resistant to water permeability a pigment and a biologically active material;
d) a film-forming latex coating on the side edges;
said extensible paper having an elongation of greater than 5% in the machine and cross machine directions of formation of the paper substrate;
said film-forming latex comprising an oil in water emulsion forming a film at drying temperatures of less than 100° C.;
said first coating having a coat weight of 8 to 18 grams per sq. meter of the paper substrate;
said second coating being applied at a rate sufficient to form a coat weight of 8 to 18 grams per sq. meter of the paper substrate;
said paper substrate having a weight of at least 37 grams per sq. meter of the paper substrate;
said agricultural mulch having a ratio of wet tensile strength to dry tensile strength of from 0.9 to about 1.7;
said water repellant providing the first coating with a water contact angle of at least 70°;
said agricultural mulch coated top and bottom surfaces being resistant to water permeability, as measured according to a test method for water permeability set forth in Example 1 herein such that when said agricultural mulch is placed on the surface of water at ambient temperature, said agricultural mulch does not curl out of the plane of the surface of the water within 5 seconds of placement in contact with the surface of the water.

18. The agricultural mulch according to claim 17 wherein the latex is a carboxylated styrene butadiene latex.

19. The agricultural mulch according to claim 17 wherein the latex is a styrene butadiene latex.

20. The agricultural mulch according to claim 17 wherein the pigment is selected from the group consisting of carbon black, clay, calcium carbonate, urea formaldehyde, pigment, and calcined clay.

21. The agricultural mulch according to claim 17 wherein the biologically active material is selected from the group of biologically active material comprising herbicide, plant nutrient, trace element, pheromone, insecticide, fungicide and fertilizer.

22. The agricultural mulch according to claim 17 wherein the film-forming latex on the side edges includes in addition copper-8-quinolinolate.

23. The agricultural mulch according to claim 17 wherein the water repellant is selected from paraffin wax and polyfluorocarbon.

24. The agricultural mulch according to claim 17 wherein the first and second coating in addition contain a binder.

* * * * *